(12) United States Patent
Bobba et al.

(10) Patent No.: US 10,005,408 B2
(45) Date of Patent: Jun. 26, 2018

(54) ENERGY ABSORBING SYSTEM FOR CONFLICTING REGULATORY REQUIREMENTS FOR VEHICLE BUMPERS

(75) Inventors: Somasekhar Venkat Bobba, Bangalore (IN); Dhanendra Kumar Nagwanshi, Bangalore (IN); Matthew D. Marks, Waterford, MI (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 1436 days.

(21) Appl. No.: 13/288,298

(22) Filed: Nov. 3, 2011

(65) Prior Publication Data

US 2013/0113226 A1    May 9, 2013

(51) Int. Cl.
*B60R 19/18*    (2006.01)

(52) U.S. Cl.
CPC ........ *B60R 19/18* (2013.01); *B60R 2019/186* (2013.01); *B60R 2019/1893* (2013.01)

(58) Field of Classification Search
USPC ........ 188/371, 377; 293/102, 120, 130, 132, 293/133; D12/169
See application file for complete search history.

(56) References Cited

U.S. PATENT DOCUMENTS

| | | | |
|---|---|---|---|
| 1,433,201 A * | 10/1922 | Grant ........................... | 293/102 |
| 3,744,835 A * | 7/1973 | Carbone et al. .............. | 293/120 |
| 3,871,636 A * | 3/1975 | Boyle ........................... | 267/140 |
| 3,938,841 A * | 2/1976 | Glance et al. ................ | 293/120 |
| 3,949,697 A * | 4/1976 | Ueda ............................. | 114/219 |

(Continued)

FOREIGN PATENT DOCUMENTS

| | | |
|---|---|---|
| EP | 1038733 A2 | 9/2000 |
| EP | 1065108 A2 | 1/2001 |

(Continued)

OTHER PUBLICATIONS

European Enhanced Vehicle-Safety Committee; EEVC Working Group 17 Report, "Improved Test Methods to Evaluate Pedestrian Protection Afforded by Passenger Cars"; Dec. 1998; Updated Sep. 2002; 98 Pages.

(Continued)

*Primary Examiner* — D Glenn Dayoan
*Assistant Examiner* — Paul Chenevert
(74) *Attorney, Agent, or Firm* — Cantor Colburn LLP

(57) ABSTRACT

In an embodiment, multi-stage energy absorbing system can comprise: a thermoplastic flanged frame and a crush lobe having a proximal base aligned with the flanged frame and a distal end protruding from the flanged frame. The crush lobe comprises a central slab and slab pairs such that the crush lobe comprises a total of 2i+1 slabs, wherein i is the number of slab pairs and is greater than or equal to 1. The slabs are disposed in a stepped arrangement and configured to absorb impact energy by collapsing in a telescopic manner with increasing energy level. The single energy-absorbing system is able to absorb low energy impact associated with vehicle-to-pedestrian impact; simultaneously with the ability to mitigate damageability associated with low-speed vehicle-to-barrier impact, as well as damageability associated with vehicle-to-vehicle moderate speed impact, head-on, as well as at an angle.

19 Claims, 11 Drawing Sheets

(56) References Cited

U.S. PATENT DOCUMENTS

| | | | |
|---|---|---|---|
| D243,323 S * | 2/1977 | Waldsmith | D12/169 |
| 4,050,726 A * | 9/1977 | Hablitzel | 293/122 |
| 4,061,384 A * | 12/1977 | Montgomery et al. | 293/109 |
| 4,098,525 A | 7/1978 | Schwanz et al. | |
| 4,154,469 A * | 5/1979 | Goupy et al. | 293/120 |
| 4,186,915 A | 2/1980 | Zeller et al. | |
| 4,252,355 A * | 2/1981 | Goupy et al. | 293/120 |
| 4,940,270 A | 7/1990 | Yamazaki et al. | |
| D328,272 S * | 7/1992 | Hasmanis et al. | D12/169 |
| 5,219,197 A * | 6/1993 | Rich et al. | 293/120 |
| 5,407,239 A * | 4/1995 | Arai et al. | 293/146 |
| 5,722,708 A | 3/1998 | Jonsson | |
| 5,780,129 A * | 7/1998 | Ohta | 428/35.7 |
| 5,857,734 A | 1/1999 | Okamura et al. | |
| 5,876,077 A * | 3/1999 | Miskech et al. | 293/132 |
| D431,506 S | 10/2000 | Runfola | |
| 6,179,355 B1 | 1/2001 | Chou et al. | |
| 6,315,339 B1 * | 11/2001 | Devilliers et al. | 293/132 |
| 6,361,092 B1 * | 3/2002 | Eagle et al. | 293/102 |
| 6,398,275 B1 * | 6/2002 | Hartel et al. | 293/102 |
| 6,481,690 B2 * | 11/2002 | Kariatsumari et al. | 293/155 |
| 6,536,818 B1 * | 3/2003 | Moss | 293/134 |
| 6,547,295 B2 * | 4/2003 | Vismara | 293/133 |
| 6,575,510 B2 * | 6/2003 | Weissenborn | 293/121 |
| 6,637,786 B2 * | 10/2003 | Yamagiwa | 293/102 |
| 6,648,383 B2 * | 11/2003 | Vismara et al. | 293/120 |
| 6,669,252 B2 * | 12/2003 | Roussel et al. | 293/120 |
| 6,685,243 B1 * | 2/2004 | Evans | 293/102 |
| 6,726,261 B2 * | 4/2004 | Goto et al. | 293/120 |
| 6,733,054 B2 * | 5/2004 | Kim | 293/102 |
| 6,733,055 B2 * | 5/2004 | Iino | 293/142 |
| 6,846,026 B2 * | 1/2005 | Detwiler et al. | 293/102 |
| 6,869,123 B2 | 3/2005 | Marks et al. | |
| 6,890,009 B2 * | 5/2005 | Murata et al. | 293/109 |
| 6,902,215 B1 * | 6/2005 | Condeelis | 293/117 |
| D515,989 S | 2/2006 | Choi et al. | |
| 6,994,384 B2 * | 2/2006 | Shuler et al. | 293/120 |
| 7,025,396 B2 * | 4/2006 | Omura et al. | 293/102 |
| 7,044,514 B2 | 5/2006 | Mustafa et al. | |
| 7,159,911 B2 * | 1/2007 | Nguyen et al. | 293/102 |
| D580,319 S | 11/2008 | Gueler et al. | |
| 7,494,165 B2 * | 2/2009 | Evans et al. | 293/102 |
| 7,513,344 B2 | 4/2009 | Toccalino et al. | |
| 7,516,993 B2 * | 4/2009 | Bouchez et al. | 293/120 |
| 7,516,994 B2 * | 4/2009 | Ito | 293/133 |
| 7,568,746 B2 | 8/2009 | Jaarda et al. | |
| D603,764 S | 11/2009 | Youn | |
| D603,765 S | 11/2009 | Youn | |
| D607,790 S | 1/2010 | Golden et al. | |
| D607,791 S | 1/2010 | Golden et al. | |
| 7,686,358 B2 * | 3/2010 | Takahashi et al. | 293/102 |
| 7,690,703 B2 | 4/2010 | Maruko | |
| 7,699,367 B2 | 4/2010 | Evans et al. | |
| 7,699,383 B2 * | 4/2010 | Fukukawa et al. | 296/187.04 |
| D624,471 S | 9/2010 | Green | |
| 7,866,716 B2 | 1/2011 | Perucca et al. | |
| 7,887,121 B2 * | 2/2011 | Hasegawa et al. | 296/187.04 |
| 7,938,462 B2 | 5/2011 | Nilsson | |
| 7,954,866 B2 | 6/2011 | Barcomb et al. | |
| 8,042,847 B2 * | 10/2011 | Garg et al. | 293/102 |
| 8,087,706 B2 | 1/2012 | Karlander et al. | |
| 8,096,595 B2 | 1/2012 | Muskos | |
| 8,191,944 B2 | 6/2012 | Rinklin | |
| D670,217 S * | 11/2012 | Bobba et al. | D12/196 |
| D670,218 S * | 11/2012 | Bobba et al. | D12/196 |
| 8,336,933 B2 * | 12/2012 | Nagwanshi et al. | 293/132 |
| 8,480,143 B2 * | 7/2013 | Huang et al. | 293/120 |
| 8,684,427 B2 * | 4/2014 | Marur et al. | 293/102 |
| 2001/0054826 A1 * | 12/2001 | Hirota | 293/102 |
| 2002/0005644 A1 | 1/2002 | Tamada et al. | |
| 2002/0040525 A1 | 4/2002 | Himsl et al. | |
| 2003/0227182 A1 | 12/2003 | Yoshida et al. | |
| 2004/0056491 A1 * | 3/2004 | Murata et al. | 293/120 |
| 2004/0113461 A1 | 6/2004 | Shimizu et al. | |
| 2004/0130167 A1 * | 7/2004 | Mori et al. | 293/102 |
| 2004/0174025 A1 | 9/2004 | Converse et al. | |
| 2005/0087997 A1 * | 4/2005 | Zander et al. | 293/102 |
| 2005/0230205 A1 | 10/2005 | Springler et al. | |
| 2005/0236850 A1 * | 10/2005 | Evans et al. | 293/102 |
| 2006/0028034 A1 * | 2/2006 | Lee | 293/102 |
| 2006/0145490 A1 * | 7/2006 | Yamaguchi et al. | 293/109 |
| 2006/0286342 A1 | 12/2006 | Elzey | |
| 2007/0114803 A1 * | 5/2007 | Takahashi | B60R 19/483 293/102 |
| 2007/0182170 A1 * | 8/2007 | Renault et al. | 293/102 |
| 2007/0187958 A1 * | 8/2007 | Bouchez et al. | 293/102 |
| 2007/0200376 A1 | 8/2007 | Jaarda et al. | |
| 2008/0093831 A1 | 4/2008 | Ellison | |
| 2009/0256370 A1 | 10/2009 | Siler et al. | |
| 2010/0102580 A1 * | 4/2010 | Brooks et al. | 293/133 |
| 2010/0326782 A1 | 12/2010 | VandenBerge et al. | |
| 2011/0006554 A1 | 1/2011 | Mani | |
| 2011/0109122 A1 * | 5/2011 | Clausen et al. | 296/187.03 |
| 2011/0127783 A1 | 6/2011 | Shimotsu et al. | |
| 2011/0175379 A1 * | 7/2011 | Erzgraber et al. | 293/132 |
| 2012/0049569 A1 * | 3/2012 | Chickmenahalli et al. | 296/187.05 |
| 2012/0146347 A1 * | 6/2012 | Huang et al. | 293/132 |
| 2013/0175128 A1 * | 7/2013 | Kumar et al. | 188/377 |

FOREIGN PATENT DOCUMENTS

| | | | |
|---|---|---|---|
| FR | 2736315 | | 7/1995 |
| FR | 2870802 A1 | | 12/2005 |
| GB | 2032575 A | | 9/1978 |
| JP | 59006152 A | * 1/1984 | B60R 19/02 |
| JP | 62144928 A | * 6/1987 | B29C 65/02 |
| JP | 2002012107 A | | 1/2002 |

OTHER PUBLICATIONS

FR2736315; Date of Publication Jul. 7, 1995; 1 page; Machine Generated English Translation.

International Search Report for International Application No. PCT/US2012/062351; International Filing Date Oct. 29, 2012; dated Jan. 30, 2013; 4 pages.

Written Opinion of the International Search Report for International Application No. PCT/US2012/062351; International Filing Date Oct. 29, 2012; dated Jan. 30, 2013; 5 pages.

Korean Patent No. 100488874; Date of Publication: May 11, 2005; Machine Translation, 9 pages.

\* cited by examiner

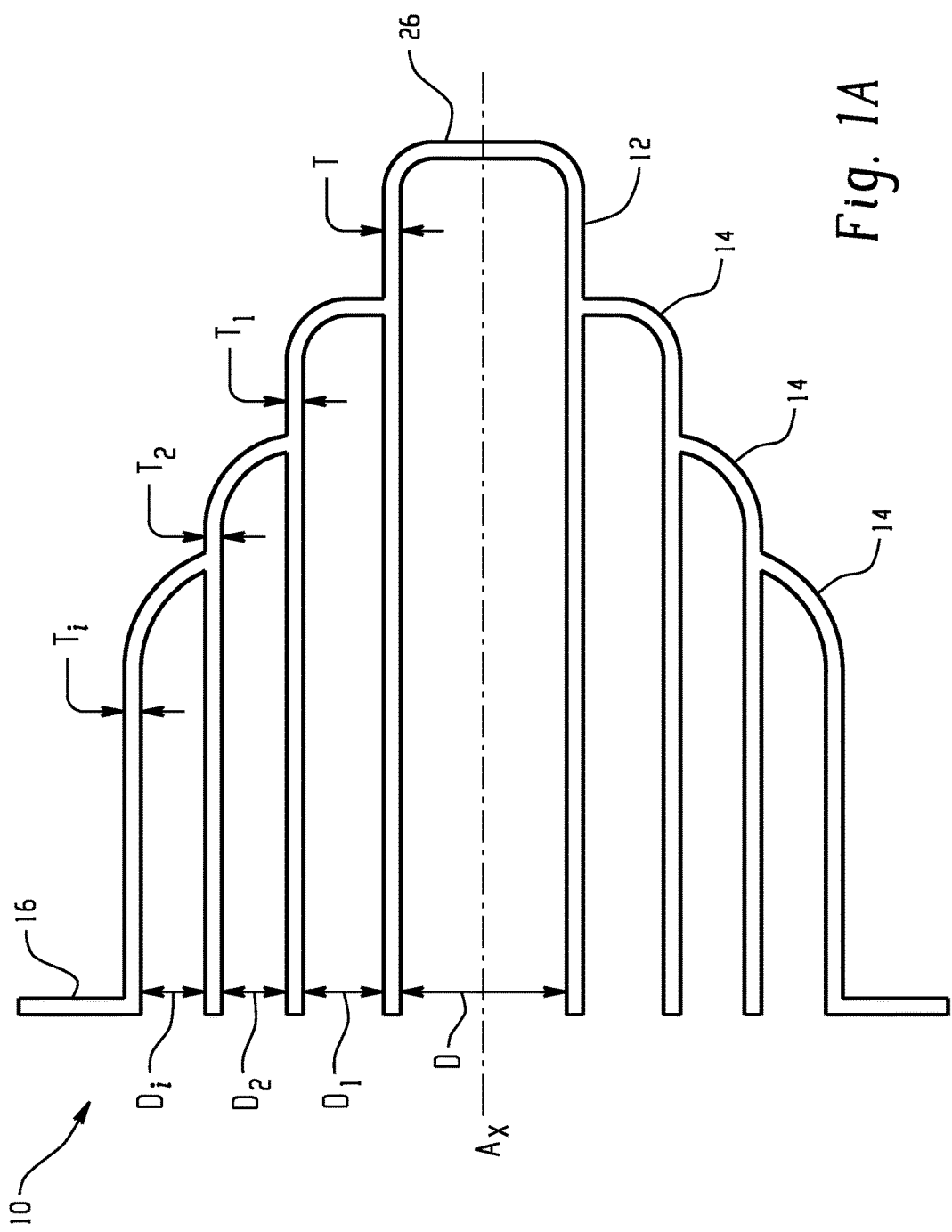

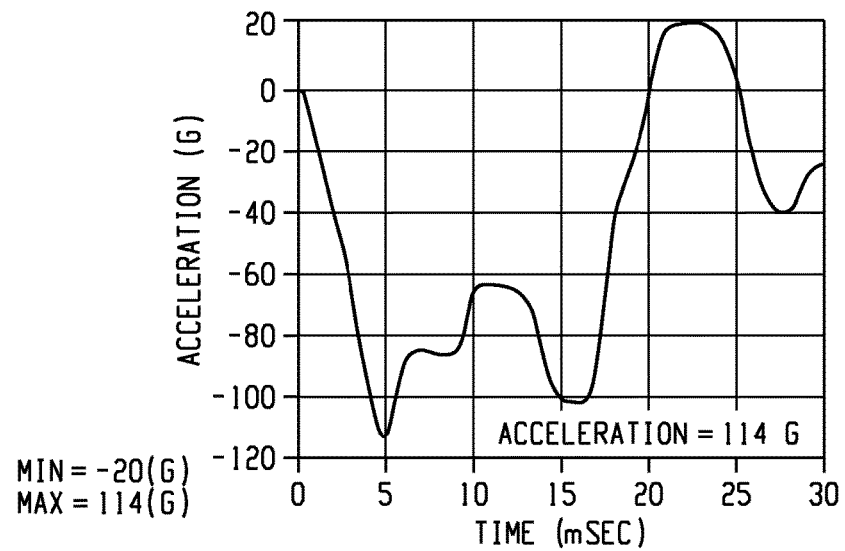
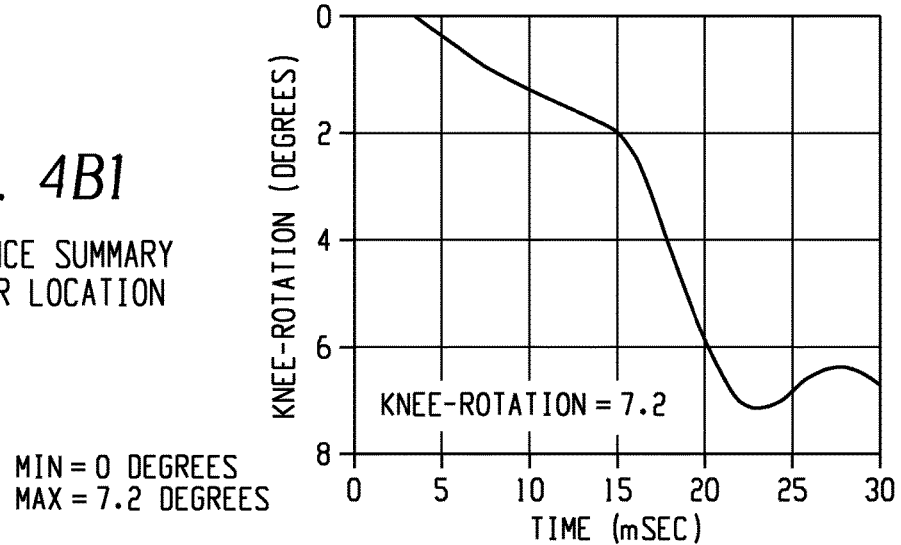
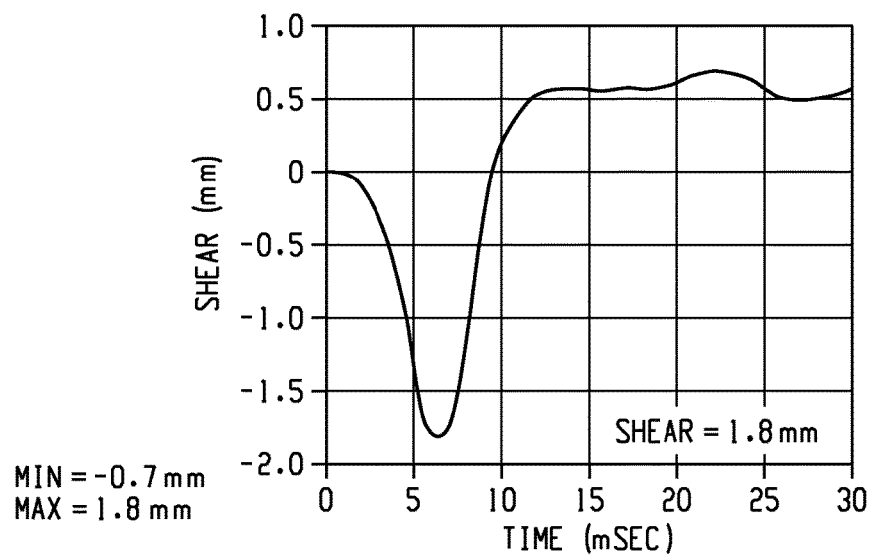
Fig. 4B1
PERFORMANCE SUMMARY
AT CENTER LOCATION

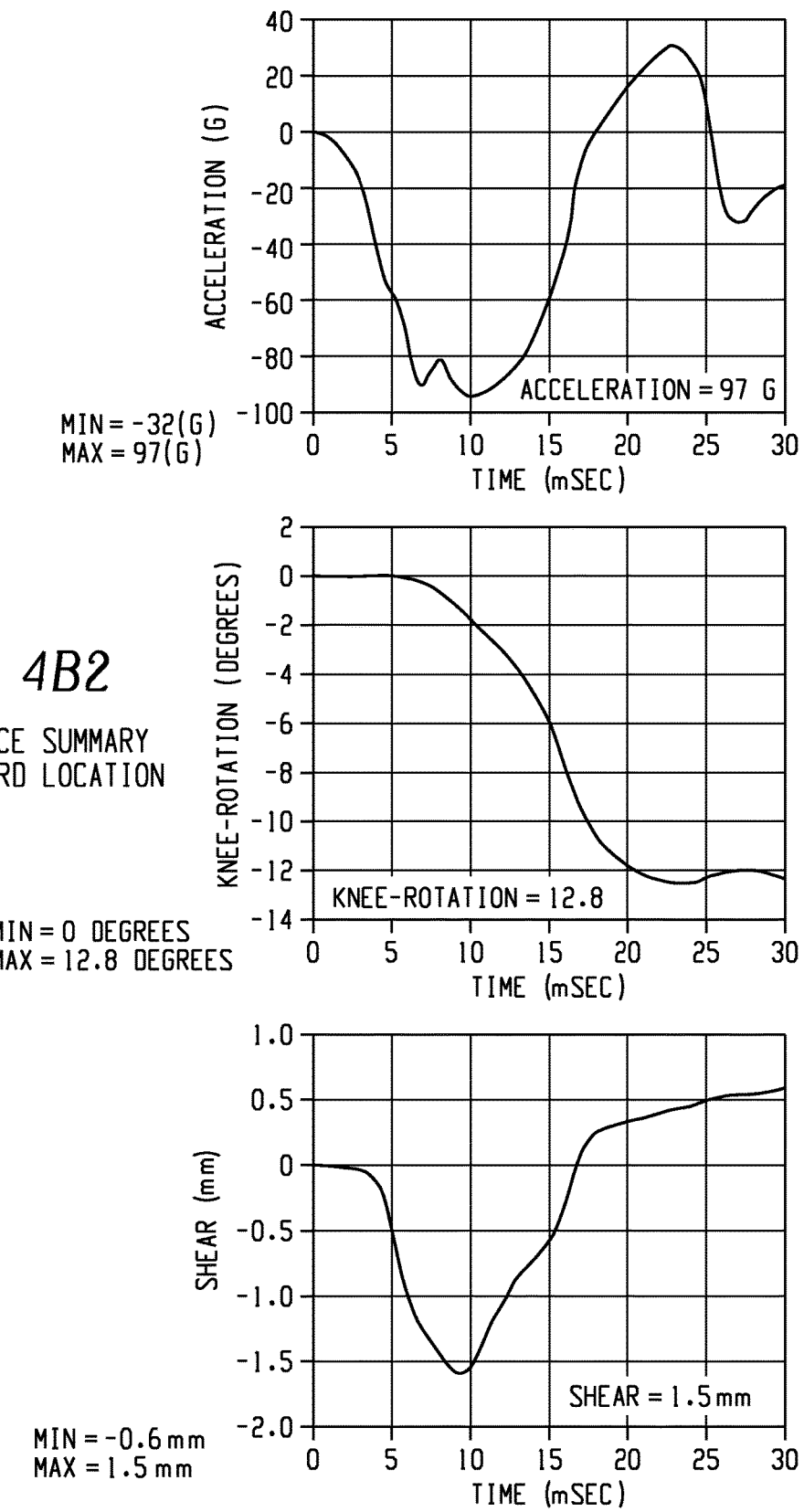
Fig. 4B2
PERFORMANCE SUMMARY AT OUT-BOARD LOCATION

MIN = 0 kN
MAX = 122 kN

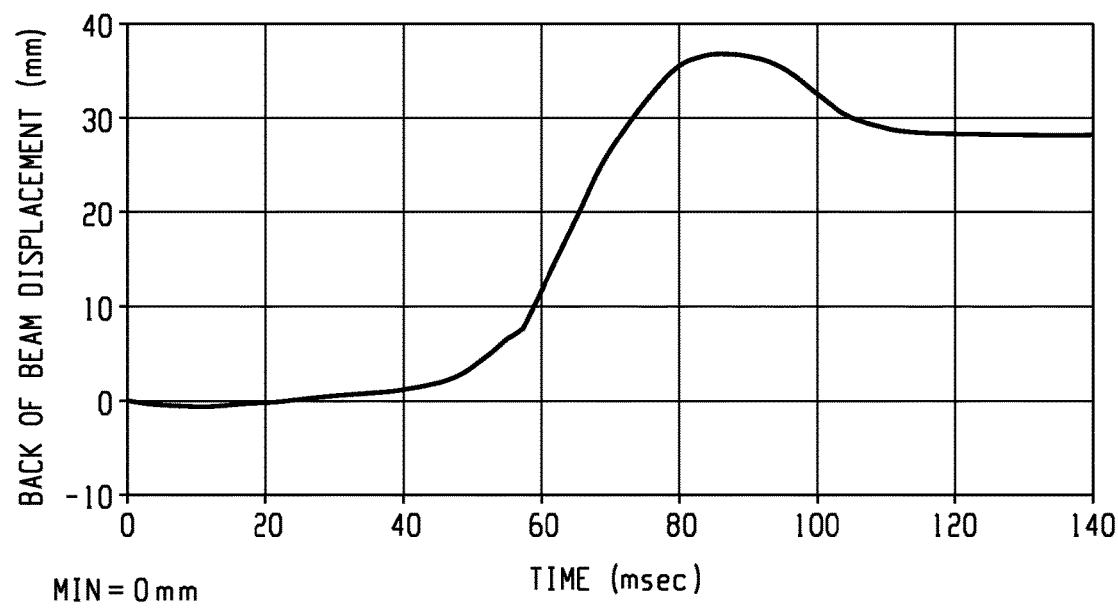
Fig. 8
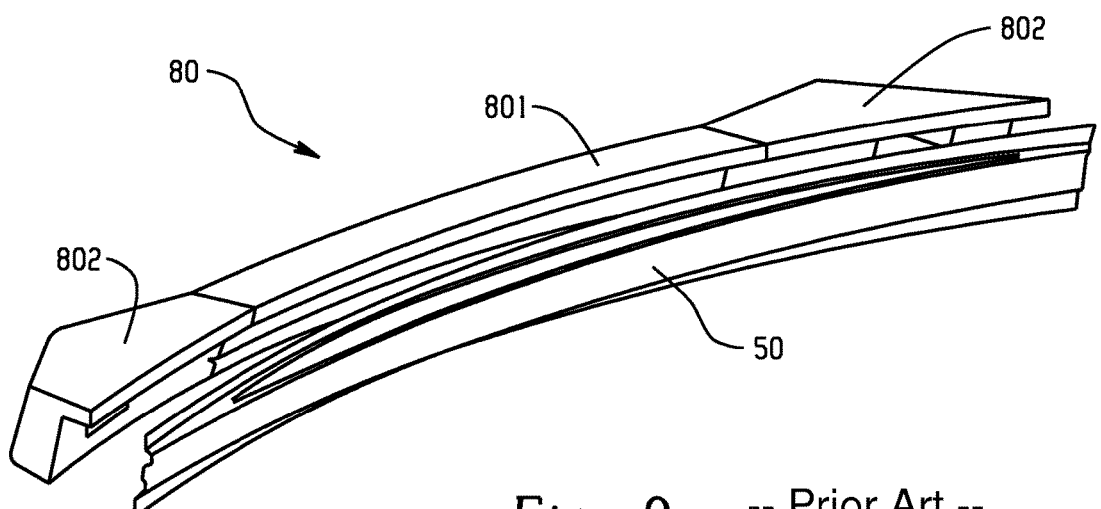
Fig. 9  -- Prior Art --

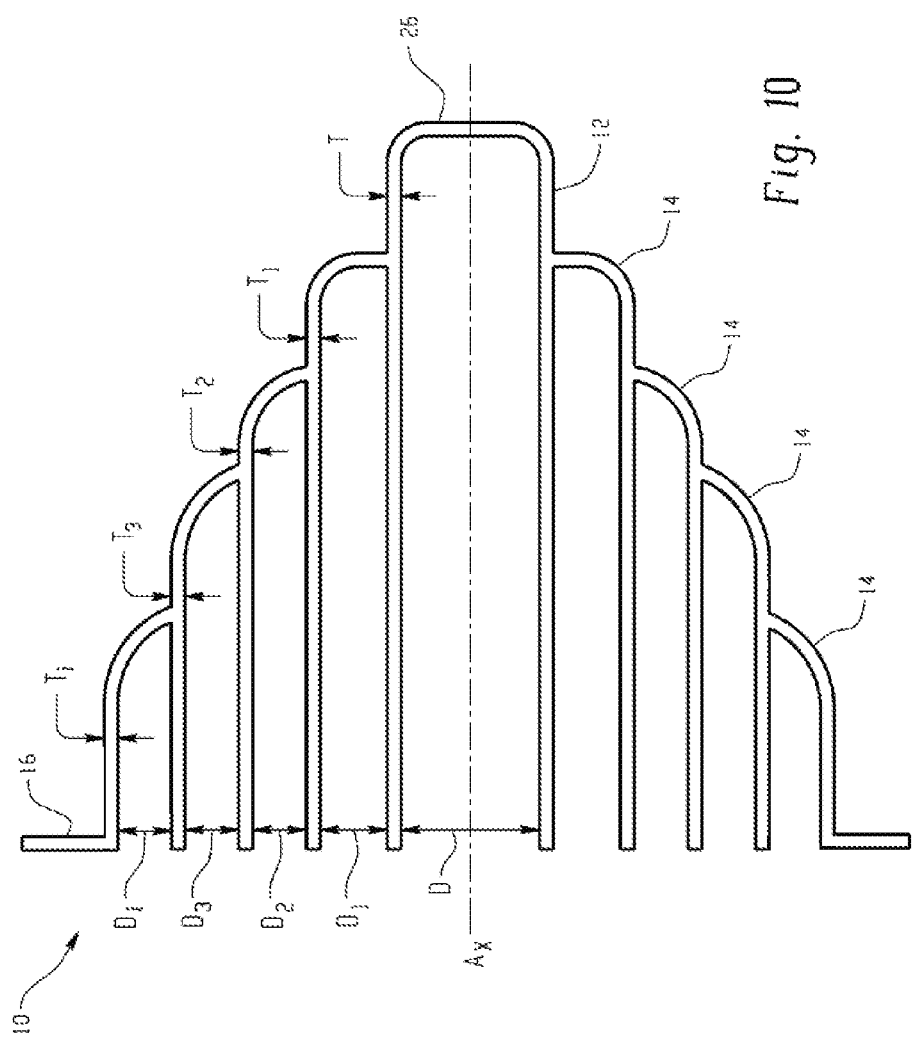

ENERGY ABSORBING SYSTEM FOR CONFLICTING REGULATORY REQUIREMENTS FOR VEHICLE BUMPERS

TECHNICAL FIELD

The present disclosure relates to motor vehicle components and, in particular, to motor vehicle bumper systems capable of absorbing impact energy at different levels.

BACKGROUND

Current requirements of the federal authorities in the United States (FMVSS) and Europe on one hand, and the Insurance (IIHS) and Automobile industries on another, create contradicting design constraints for vehicle front bumper system. These design constraints require a single energy-absorbing system to be able to absorb low energy impact associated with vehicle-to-pedestrian impact; simultaneously with the ability to mitigate damageability associated with low-speed vehicle-to-barrier impact, as well as damageability associated with vehicle-to-vehicle moderate speed impact, head-on, as well as at an angle. To be commercially viable, these requirements must be met within the packaging constraints of the vehicle bumper system with regard to weight, size, and costs.

To date, existing energy absorber systems are challenged to meet all design constraints from all aspects, namely the insurance and car industries as well as the various regulatory authorities.

Accordingly, the need exists for an energy absorbing system which addresses the conflicting energy absorption level requirements while not adversely affecting costs and performance of the vehicle.

SUMMARY

Disclosed herein are multi-stage energy absorber systems and methods for making and using the same.

In one embodiment, a multi-stage energy absorbing system comprises: a thermoplastic flanged frame and a crush lobe having a proximal base aligned with the flanged frame and a distal end protruding from the flanged frame. The crush lobe comprises a central slab and slab pairs such that the crush lobe comprises a total of 2i+1 slabs, wherein i is the number of slab pairs and is greater than or equal to 1. The slabs are disposed in a stepped arrangement and configured to absorb impact energy by collapsing in a telescopic manner with increasing energy level.

In one embodiment, a multi-stage energy absorbing system comprises: a base; a first stage extending from the base and defined by a first stage top load wall, a first stage bottom load wall, and a front wall that extends between the first stage top load wall and the first stage bottom load wall; and a second stage extending from the base and defined by a pair of second slabs located adjacent to the first stage, wherein one of the second slabs is defined by a portion of the first stage top load wall, a second stage top load wall, and a second stage front wall that extends between the portion of the first stage top load wall and the second stage top load wall, and wherein the other second slab is defined by a portion of the first stage bottom load wall, a second stage bottom load wall, and another second stage front wall that extends between the portion of the first stage bottom load wall and the second stage bottom load wall. The first stage can extend from the base a greater distance than the second stage. The second stage can be configured to absorb a greater amount of energy than the first stage.

In one embodiment, a vehicle comprises: a bumper beam; a fascia; and an energy absorbing system located between the bumper beam and the fascia. The energy absorbing system comprises a base; a first stage extending from the base and defined by a first stage top load wall, a first stage bottom load wall, and a front wall that extends between the first stage top load wall and the first stage bottom load wall; and a second stage extending from the base and defined by a pair of second slabs located adjacent to the first stage, wherein one of the second slabs is defined by a portion of the first stage top load wall, a second stage top load wall, and a second stage front wall that extends between the portion of the first stage top load wall and the second stage top load wall, and wherein the other second slab is defined by a portion of the first stage bottom load wall, a second stage bottom load wall, and another second stage front wall that extends between the portion of the first stage bottom load wall and the second stage bottom load wall. The first stage can extend from the base a greater distance than the second stage. The second stage can be configured to absorb a greater amount of energy than the first stage.

In one embodiment, a method for absorbing energy comprises: impacting an energy absorbing system with impact energy. The energy absorbing system comprises a base; a first stage extending from the base and defined by a first stage top load wall, a first stage bottom load wall, and a front wall that extends between the first stage top load wall and the first stage bottom load wall; and a second stage extending from the base and defined by a pair of second slabs located adjacent to the first stage, wherein one of the second slabs is defined by a portion of the first stage top load wall, a second stage top load wall, and a second stage front wall that extends between the portion of the first stage top load wall and the second stage top load wall, and wherein the other second slab is defined by a portion of the first stage bottom load wall, a second stage bottom load wall, and another second stage front wall that extends between the portion of the first stage bottom load wall and the second stage bottom load wall. The first stage can extend from the base a greater distance than the second stage. The second stage can be configured to absorb a greater amount of energy than the first stage.

The foregoing and other features of the present invention will be more readily apparent from the following detailed description and drawings of the illustrative embodiments.

BRIEF DESCRIPTION OF THE DRAWINGS

Refer now to the Figures, which are exemplary, not limiting, and wherein like elements are numbered alike.

FIG. 4B shows the results of the test illustrated in FIG. 3 at the center ("Y=0") of the Energy Absorbing (EA) system (FIG. 4A) and at the outboard location ("Y=470") of the EA system (FIG. 4A), both at impact level of about 850 Joules, whereas the EA is intended to absorb about 450 Joules (J), whereas the graphs set for acceleration (G).

FIG. 8 is a graphical illustration of the back of beam displacement determined using the test setup of FIG. 6.

FIG. 9 is a bottom right isometric view of a typical prior art foam and thermoplastic EA system.

FIG. 10 shows a schematic illustration of a top left perspective view of an embodiment of a multi-stage energy absorbing system where n=number of stages.

DETAILED DESCRIPTION

Figure 1B:
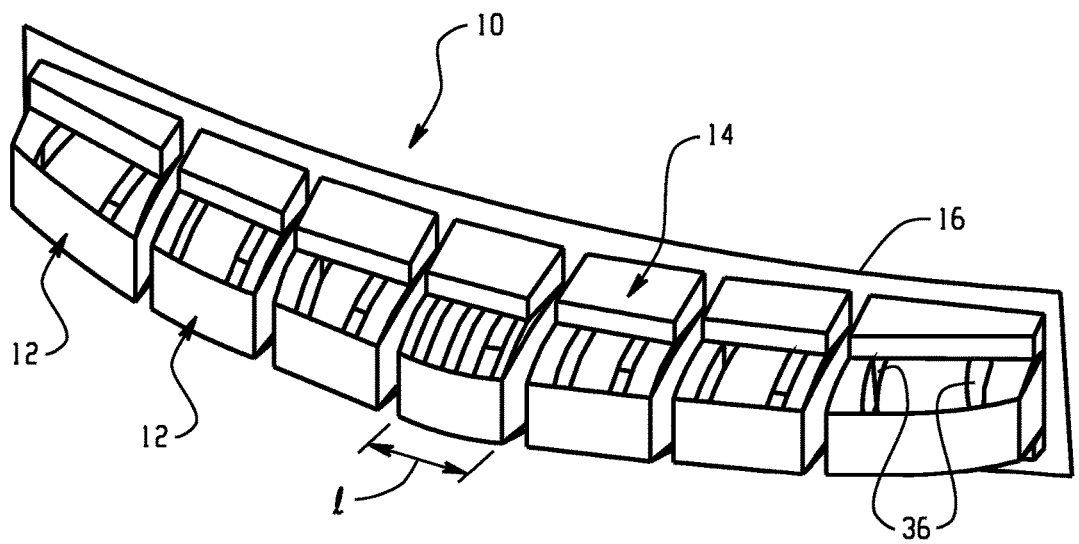
FIG. 1 shows (1A) a schematic illustration of a top left perspective view of an embodiment of a multi-stage energy absorbing system where n=number of stages; (1B) a top right perspective view of a multi-stage energy absorbing system according to one embodiment where n=2; and (1C) a cross-sectional schematic of the multi-stage energy absorbing system of FIG. 1B.

The present multistage energy absorber systems are more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, in addition to "comprising" the embodiments may "consisting of" or may "consisting essentially of" the elements of the claim. Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

In an embodiment, the multi-stage EA system includes at least two energy absorbing stages that provide different energy absorption characteristics to the system. The first energy absorbing stage can provide an energy absorption characteristic that is generally useful for low-impact and/or low-speed collisions. Subsequent energy absorbing stages provide an energy absorption characteristic that is generally useful for impact and/or collisions of higher energy density or speed as per the bumper structural test procedures.

Accordingly, in one embodiment, a multi-stage energy absorbing system comprises: a thermoplastic flanged frame and plurality of crush lobes, said lobes having a proximal base aligned with the flanged frame and a distal end protruding from the flanged frame, wherein each lobe can comprise $2_i+1$ coaxial (e.g., along axis "$A_x$", see FIG. 1A) or nested slabs which extend longitudinally (i.e., the major axis), the slabs disposed in a stepped arrangement and configured to absorb impact by collapsing in a telescopic manner (e.g., nested) with increasing energy level. The center slab and each adjacent pair of slabs (i.e. the $i^{th}$ pair), represent a stage in the multi-stage energy absorbing system described herein. The slabs comprise a void to allow crushing (e.g., they are hollow). Each slab has sidewalls extending to a front wall that connects the side walls. The side walls can be parallel or can converge toward the front wall. The side walls can also be either straight or bowed, as desired, to attain the desired crush/collapse profile.

The center slab energy absorbing stage may be designed as the first stage to have a lower impact resistance through one or more first stage elements (also known as slabs). These elements may be designed according to one or more factors including, but not limited to, the shape of the first stage elements, degree of corrugation, the materials used to construct the first stage elements, the use of first stage elements having different impact resistances, opening(s) in the side wall(s), and/or the use of first stage elements that are constructed from different materials.

Accordingly, the central slab of a given lobe (e.g., which forms the central axis of a crush lobe) is referred to as a first stage element, wherein the first stage elements may be designed to have a lesser impact resistance as a result of the shape of the elements. The first stage elements may, in one embodiment, include a looped structure that projects from the multi-stage EA system's flanged frame, wherein the closed portion of the loop extends furthest from the motor vehicle to which the multi-stage EA system is attached.

In an embodiment, the multi-stage EA system is arranged in a stepped configuration, wherein the first stage or center slab protrudes furthest from the flanged frame which is configured to attach to a vehicle (e.g., to a bumper beam, the body in white, rails, etc.). In the various embodiments, the center slab has neighboring slabs (e.g., 1 to 4, or more, pairs of neighboring slabs (e.g., i is 1 to 4)), wherein each pair of slabs represent a stage in the energy absorbing system. The slab pairs can be nested. In other words, each slab of an $i^{th}$ pair can be located on opposite sides of the central slab, nesting the central slab, such that the central slab, when it crushes, crushes into and/or between the adjacent slab pair. In various embodiments, the slab pairs can be coaxial.

In an embodiment, each stage of the energy absorbing system can be tuned, by changing corrugations, thickness, and/or openings (e.g., slots) along the crush lobes. As provided herein, the first stage, which in an embodiment, is softer with slots and/or lower thickness as compared to subsequent energy absorber lobes, is referred to as upper energy absorber (e.g. FIG. 1C, UEA). The first stage can be configured to address pedestrian safety. The second stage, where the slabs can have higher thickness, and wherein multiple slabs (e.g., a slab pair) are involved in the axial crushing, results in stiffer elements. These slabs can be configured to absorb higher energy levels to address, for example, 49 C.F.R. Part 581. IIHS impacts can be addressed with the second stage or addressed in the subsequent stage (s).

Figure 2:
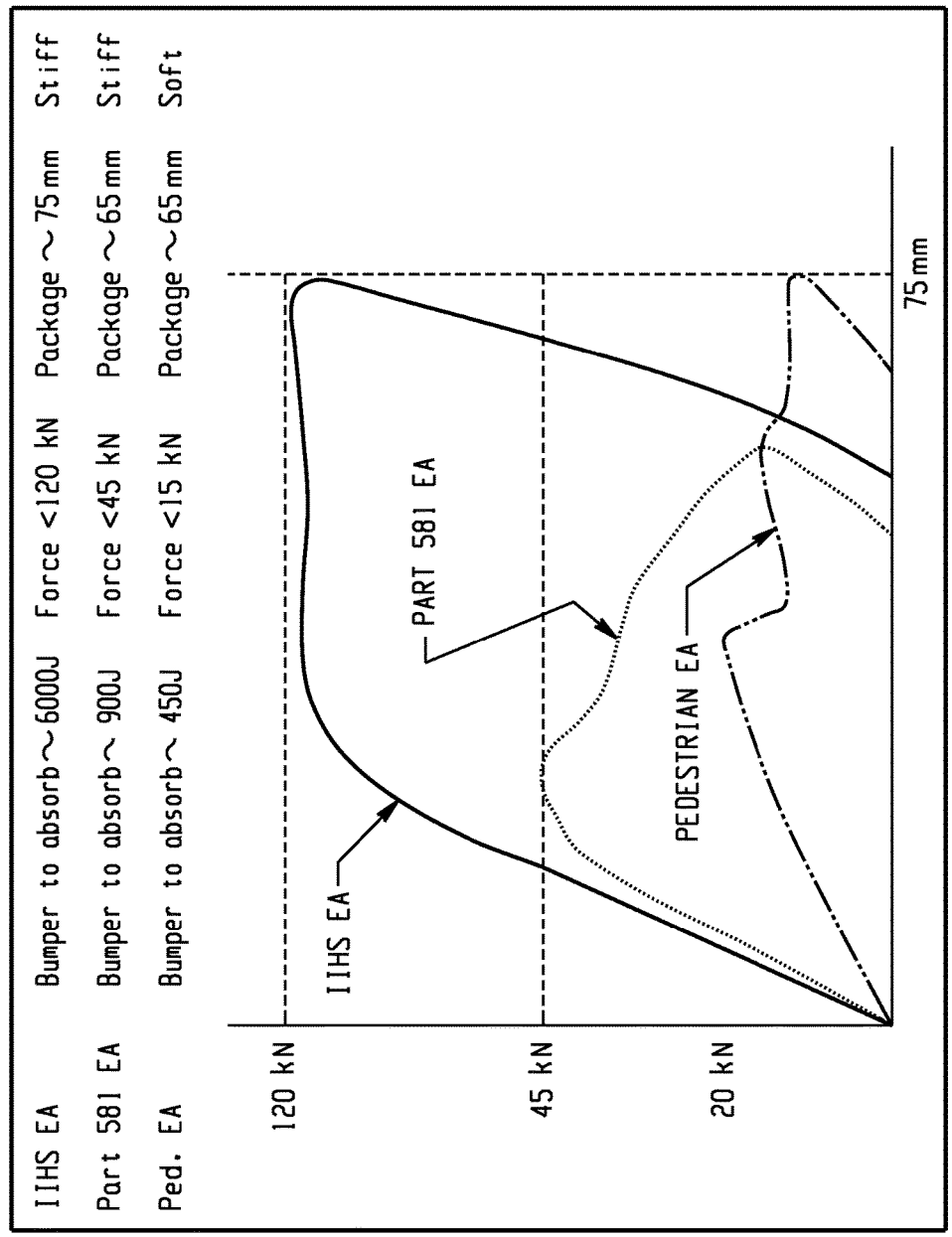
FIG. 2 shows the conflicting requirements for energy absorption creating the design constraints addressed herein.

An example of energy levels to be absorbed during multiple stage collapse is shown in FIG. 2. During the first stage, front/first stage crush lobe (e.g., UEA), collapses and imparts an initial reaction force. This initial reaction force, which is preferably a minimum reaction force as compared to the remaining stages, can be, for example, less than or equal to 15 kiloNewtons (kN), and absorb 450 J of energy (e.g., during lower leg impact). For impacts associated with low speed, e.g., vehicle-to-barrier, the subsequent stage/slab pair collapse (e.g., crush completely), in a telescopic manner to absorb a higher energy level than the first stage (e.g., up to 45 kN (e.g., greater than 15 kN up to 45 kN)), and a complete crushing with absorption of 900 J of energy to meet 49 C.F.R. Part 581 (impacts 4 kilometers per hour (kph), (2.5 miles per hour (mph))). Optionally, the second stage or a subsequent stage can absorb up to 6,000 J of energy, and offer 120 kN force (e.g., 15 kN to 120 kN, more specifically, greater than 45 kN up to 120 kN) to meet the IIHS bumper like barrier impact standard (10 kph, (6.25 mph)). The next subsequent stage absorbs even greater energy, e.g., more than 6,000 J and maintaining force value not higher than 120 kN force, for high speed crashes (50 kph). Hence, the multistage energy absorber system avoids damage both to pedestrians and vehicles during low speed vehicle-to-vehicle/vehicle-to-barrier collisions.

Regarding the height of the elements, they can all have the same height ("D") or different slabs can have a different heights (e.g., greater or less than the adjacent slabs), with slab pairs generally having the same height to enable even crushing, wherein the height is measured adjacent to the base of the energy absorber (e.g. at the end of the energy absorber adjacent the flange (16); i.e., the end opposite the front wall). As is illustrated in FIG. 1A, for example, the height of the first stage (D) can be greater than the height of the subsequent slabs (e.g., subsequent stages); $D_1, D_2, \ldots D_i$. The specific height for each slab is tailored (e.g., tuned/adjusted), so as to attain the desired crush characteristics at that stage.

The crush characteristics can further be adjusted (e.g., tailored/tuned) by the choice of wall thickness ("T"). The wall thickness of each stage is chosen so as to attain the desired crush characteristics. The wall thickness can be the same or different than an adjacent wall thickness. For example, the wall thickness can be determined according to any of the following formulas, depending upon the desired crush properties:

$$T=T_1=T_2= \ldots =T_i \qquad \text{(I)}$$

$$T<T_1<T_2< \ldots <T_i \qquad \text{(II)}$$

$$T>T_1>T_2> \ldots >T_i \qquad \text{(III)}$$

$$T<T_1>T_2< \ldots >T_i \qquad \text{(IV)}$$

wherein: i is the number of slab pairs;
T is the wall thickness of the first stage, the center slab;
$T_1$ is the wall thickness of the second stage, the first $i^{th}$ slab pair;
$T_2$ is the wall thickness of the next immediately adjacent stage, the second $i^{th}$ slab pair; and
$T_i$ is the wall thickness of the last stage, the last $i^{th}$ slab pair.

In an embodiment, the multi-stage EA system is configured such that each stage absorbs a discrete energy in a telescopic manner, with some structural integrity (and hence energy being absorbed by the whole energy absorber). In other words, each stage is configured to collapse at a desired energy level, absorbing a particular amount of energy and meeting a desired energy absorption level (e.g., a desired standard). Accordingly, the center slab (e.g., first stage) protrudes from a frame of the EA system and beyond its nearest neighbor slabs (the adjacent slabs (next stage)) e.g., by an amount of greater than or equal to 20 mm, specifically, 20 to 70 mm. The center slab can be configured to absorb impact energy up to 450 J, e.g., the amount of energy generally associated with lower leg (vehicle-to-pedestrian) impact; or configured to absorb impact energy up to 750 J. As used herein, pedestrian safe refers to absorbing the energy up to 450 J with a reaction force of up to 15 kN.

Similarly, the next stage (second stage) comprises a pair of slabs immediately adjacent to the center slab. The second stage protrudes from the frame less than the first stage and, if any, beyond its nearest neighbor slab (third stage) or the frame of the multi-stage EA system, e.g., by greater than or equal to 10 mm, specifically 20 mm to 80 mm beyond the next adjacent slab pair (and if none, from the frame). The second stage can be configured to absorb greater impact energy than the first stage (e.g., up to 1,100 J of energy); e.g., the amount of energy generally associated with vehicle-to-barrier impact under standards such as those detailed in 49 CFR Part 581. Optionally the second stage can be configured to absorb impact energy of up to 7,000 J; e.g., the amount of energy generally associated with vehicle-to-'bumper like barrier' impact under standards such as those required by the Insurance Institute for Highway Safety (IIHS) for damageability mitigation in a 10 kph collision. In addition, an optional third stage comprising of another pair of slabs immediately adjacent to the second stage slabs can protrude from the frame less than the second stage (e.g., greater than or equal to 10 mm, specifically, 20 mm to 80 mm). This stage can be configured to absorb impact energy of over 7,000 J; e.g., the amount of energy generally associated with vehicle-to-vehicle impact under standards such as those required by the Insurance Institute for Highway Safety (IIHS) for damageability mitigation in 40 mph collision. It is understood that absorbing an amount of energy up to a given amount (e.g., up to 7,000 J) means that all amounts up to and including that amount are absorbed. Clearly, additional stages can be located between any of the above stages and/or after the above stages to absorb any desired amount of impact energy; the absorber can be tuned to absorb greater and greater amounts of energy as the absorber telescopically collapses toward the frame.

Examples of materials that may be used to form the energy absorber system include, but are not limited to, plastic materials, metal materials, foam materials, or a combination comprising at least one of the foregoing. It may be beneficial to select a material for the first stage elements that has some degree of resiliency such that in a low-speed impact, the first stage elements do not break or exhibit permanent deformation, but rather spring back into shape after the impact force has been removed. As such, in very low speed collisions, the bumper can yield without damaging the object struck or the bumper itself.

The energy absorber (e.g., each stage) may be constructed from a plastic material, such as a thermoplastic material. In beneficial embodiments, the plastic material is a thermoplastic material that is flexible at temperatures of about 200° C. to about −60° C. Examples of thermoplastic materials that may be used include, but are not limited to, acrylonitrile-butadiene-styrene (ABS) (CYCOLAC* resins commercially available from SABIC Innovative Plastics), polycarbonate (LEXAN* and LEXAN* EXL resins commercially available from SABIC Innovative Plastics), polycarbonate/ABS blend (CYCOLOY* resins commercially available from SABIC Innovative Plastics), a copolycarbonate-polyester, acrylic-styrene-acrylonitrile (ASA) (GELOY* resins commercially available from SABIC Innovative Plastics), acrylonitrile-(ethylene-polypropylene diamine modified)-styrene (AES), phenylene ether resins, glass filled blends of polyphenylene oxide and polystyrene, blends of polyphenylene ether/polyamide (NORYL GTX* resins from SABIC Innovative Plastics), blends of polycarbonate/polyethylene terephthalate (PET)/polybutylene terephthalate (PBT), polybutylene terephthalate and impact modifier (XENOY* resins commercially available from SABIC Innovative Plastics), polyamides, phenylene sulfide resins, polyvinyl chloride (PVC), high impact polystyrene (HIPS), low/high density polyethylene, polypropylene and thermoplastic olefins (TPO), polyethylene and fiber composites, polypropylene and fiber composites, long fiber reinforced thermoplastics (VERTON* and STAMAX* resins commercially available from SABIC Innovative Plastics), or a combination including at least one of the foregoing thermoplastic materials. Some possible reinforcements include fibers, such as glass, carbon, and so forth, as well as combinations comprising at least one of the foregoing; e.g., long glass and/or long carbon fiber reinforced resins.

It is to be understood that, in one embodiment, the same material may be used to make each stage element, any side straps and/or any elongated strips (e.g., the flange, side walls, front wall, optional ribs, etc). However, in alternative embodiments, the stage elements may be designed to certain specifications such that different materials are used to make each stage. In addition, in alternative embodiments, different materials may be used to make different portions of the element, if applicable.

The materials used to form the elements may be selected based on the method used to make each first stage element. In one embodiment, the first stage elements may be formed using any method capable of forming a first stage element having the desired crush characteristics (e.g., energy absorption). The method used may be chosen using one or more factors including, but not limited to, the materials used to form the first stage element, the type of motor vehicle in which the motor vehicle bumper will be used, and/or the size of the motor vehicle bumper to be formed. Examples of methods that may be used include, but are not limited to, extrusion molding, blow molding, compression molding, injection molding, thermoforming, melt molding (such as co-extrusion molding, T-die extrusion, inflation extrusion, profile extrusion, extrusion coating and multi-layer injection molding) or a combination comprising at least one of the foregoing.

In an embodiment, the system is formed by injection molding of a unibody, wherein each slab pair extends beyond its predecessors culminating in co-axially (which includes nearly co-axially) disposed central slab. A cross-section of the central slab or first stage has a top load wall, a bottom load wall, an open base and a front face at a distal end from the open base, the front face having a cross-section shape that is selected from flat, slanted towards either the top or bottom load walls, a concave cross-section, or convex cross-section. In one embodiment, the second stage or first pair of slabs are attached to the top and bottom load walls of the central slab or first stage. In other words, a portion of the first stage top load wall forms a wall of the second stage.

Figure 1C:
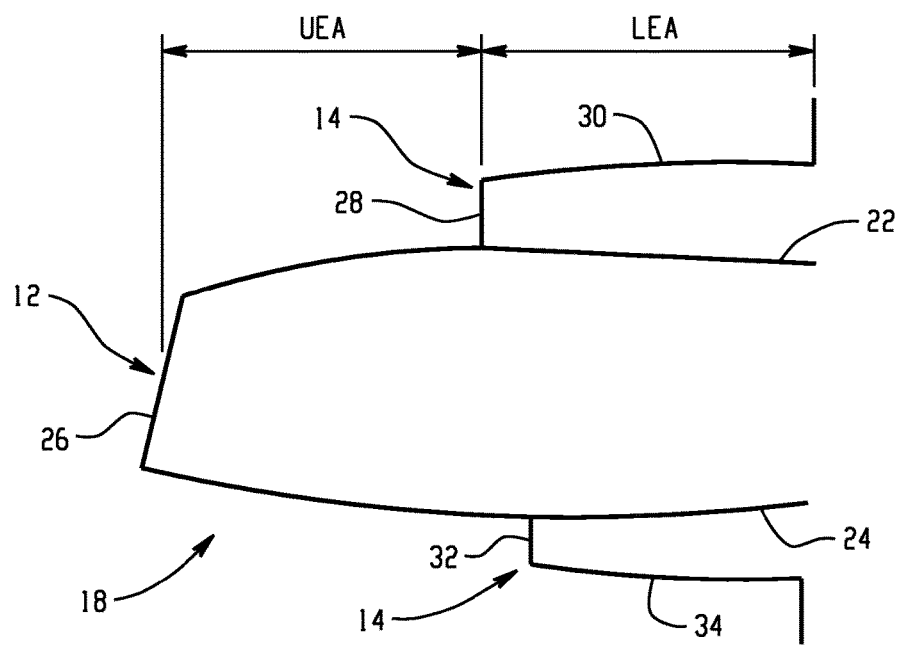

Referring to the drawings, FIG. 1 provides one embodiment of a multi-stage EA system. In this embodiment, the multi-stage EA system (10) comprises a flanged frame (16) having crush lobes ($18_{p-q}$) protruding therefrom, each crush lobe (18) comprises coaxial (along axis $A_x$) or nested slabs (14) arranged in a stepped manner around a center slab or first stage (12), as shown in FIG. 1C. The first stage or center slab (12, upper energy absorber, "UEA") extends beyond the second stage or first pair of slabs (14, lower energy absorber, "LEA"). As mentioned above, and in other words, the energy absorbing system (10) has a first stage (12) with a first stage top load wall (also referred to as side wall or first side wall) (22), a bottom load wall (also referred to as side wall or second side wall) (24), and a front wall (26). Then the second stage (14) has one slab formed by a portion of the first stage top load wall (22), a second stage front wall (28), and a second stage top load wall (30), and has another slab formed by a portion of the first stage bottom load wall (24), another second stage front wall (32), and a second stage top bottom load wall (34). As shown in FIG. 1, the multi-stage EA system comprises a plurality of individual lobes with tunable energy absorption (e.g., by changing the thickness, employing slots, choice of materials, as well as length of the side and front walls). Furthermore, corrugations (e.g., converging and/or diverging sides) can be provided on the lobes to enable them to achieve higher efficiency.

Optionally, one or more of the stages can have openings, e.g., in order to further tune its crush/collapse characteristics. For example, as is shown in FIG. 1B, top load wall (22) and/or bottom load wall (24) can have openings (e.g., slots) (36). The slot (36) can extend the length of the wall (22,24) or can extend a portion of the length of the wall (22,24). For example, the slots (36) can extend from the front wall (26) to the second stage front wall 28,32). For example, the slot can form an open area that is 5% to 50% of the area of side wall or the portion of the side wall between the front wall (26) and the second stage front wall 28/32). Also, as is illustrated, different slabs can have a different amount of open area, with the amount of open area decreasing from the center of the energy absorber system toward the ends of the energy absorber system. Similarly, the slabs of the energy absorber system can form an overall shape that is complementary to the vehicle design. For example, can form a generally convex (e.g., bowed or crowned) geometry such as illustrated in FIG. 1B. In the embodiment illustrated, the length "l" of the slabs can vary across the energy absorber system, further allowing an adjustment in crush characteristics.

FIG. 2 shows an illustration of the conflicting requirements creating the design constraints, where over an intrusion of less than 80 mm, the EA system is supposed to absorb vehicle-to-pedestrian impact at center and outboard location, maintaining force level at less than 15 kN, as well as low speed (2.5 mph) vehicle-to-barrier impact of less than 45 kN and also mitigate damageability of higher speed vehicle-to-'bumper like barrier' impact, all at a system no larger than 100 mm from the vehicle bumper beam to the fascia.

Figure 3:
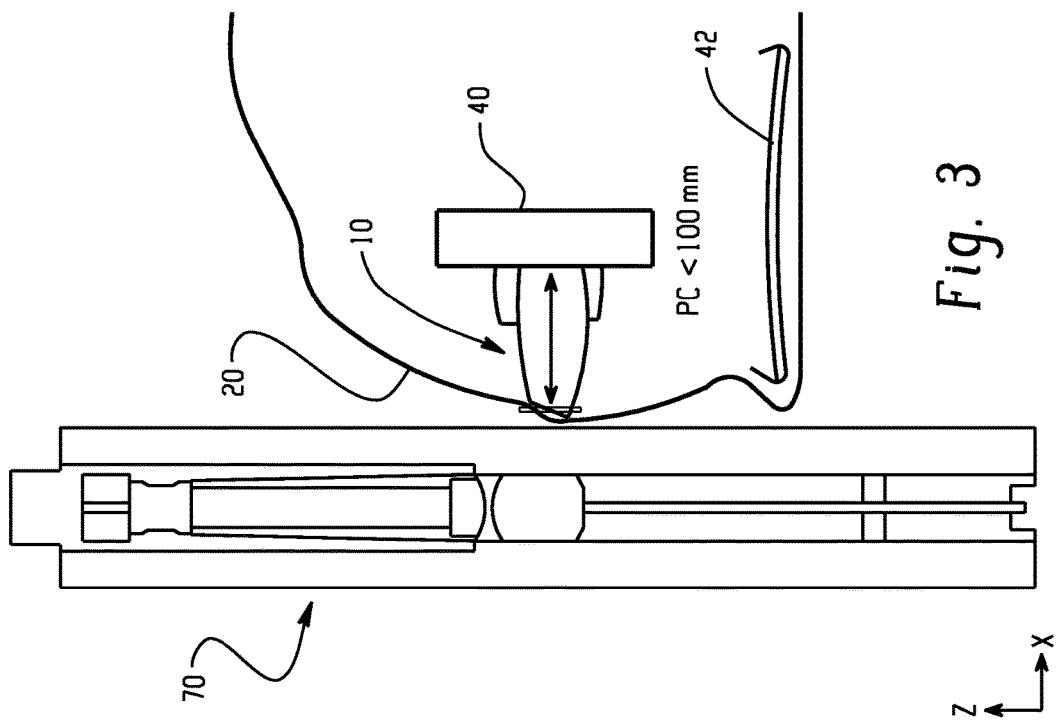
FIG. 3 shows a side view of a multi-stage energy absorbing system according to one embodiment as tested for vehicle-to-pedestrian impact.

FIG. 3 shows multi-stage energy absorbing assembly in lower leg impact test. The lower leg impact test simulates injuries that a pedestrian may have with the soft tissue injuries to the knee joint or fractures to the adjacent leg bones. These injuries occur early in the collision between the pedestrian and the vehicle. The test device simulates the human lower leg, including the knee joint. The impact takes place perpendicular to the plane of articulation of the knee. The angular movement of the knee joint at right angles to the axis of articulation is measured and reported as rotation degree. Tibia deceleration (G-load) and knee shear displacement are also measured and reported.

Figure 4A:
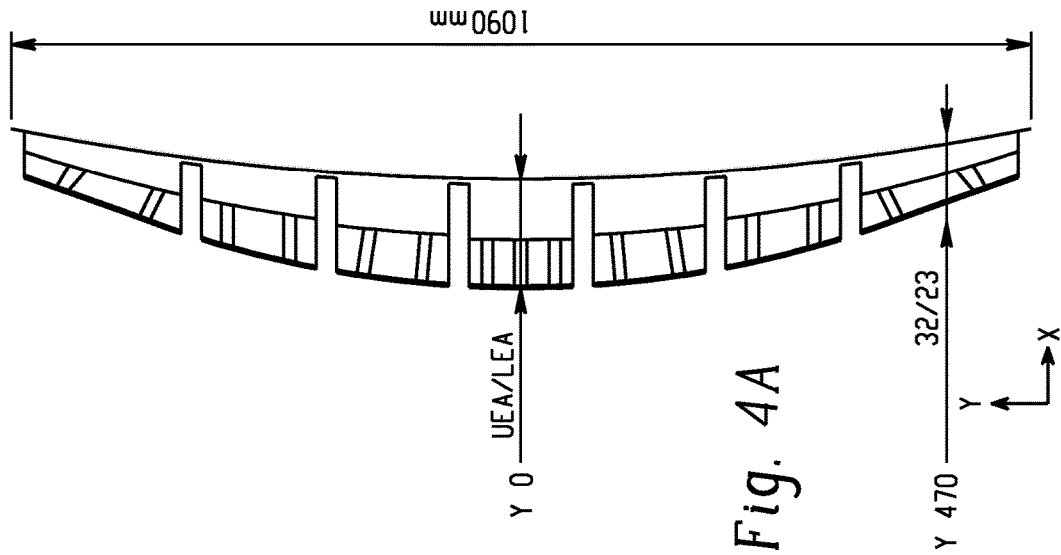
FIG. 4A is a top view of an embodiment of a multi-stage energy absorbing system illustrating the impact locations used for the test results in FIG. 4B.

Results of lower leg impact at center (Y=0) and outboard location (Y=470) are reported in FIG. 4B. The graphs illustrate the acceleration (G) versus time (in milliseconds), wherein "G" is the gravitational acceleration having value of 9.81 meters per square second (m/sec$^2$). As shown in FIG. 3, a dual stage (n=1) EA system (10) covered with a fascia (20), and located in front of a bumper beam (40), over the splash shield (42), was used with a lower leg impact test apparatus (70). The illustrated EA system has the first stage or central slab having a height ("D") that is greater than the second stage, or first pair of slabs in the stepped configuration of the nested slabs.

The complete EA unit was assembled on a generic vehicle platform, and is simulated and validated for three major impacts (lower-leg pedestrian impact, 49 CFR Part 581 and the higher speed IIHS impact protocols). In the multi-stage EA system shown, the EA system weighed 1.15 kilograms (kg), significantly lighter compared to the existing EPP foam+thermoplastic olefin (TPO) solution (about 2 kg) for the same packaging space (see e.g. FIG. 9). Present design is observed to perform more efficiently than the foam—TPO solution for a reduced packaging space 30 millimeter (mm).

Performance curves of lower leg impact for a vehicle, incorporating an embodiment of the system provided, are shown in FIG. 4. Vehicle performance was evaluated at two locations on the bumper system; one in the center referred as Y=0, and an outer most location referred as Y=470 (outboard length) along the bumper length. All the pedestrian safety targets (acceleration less than 150, knee-rotation less than 15° and Tibia-shear displacement less than 6 mm) were met with an additional safety margin (compare at: 114 and 97 G acceleration, 7.2 and 12.8° and 1.8 and 1.5 mm shear displacement for direct-frontal (Y=0) and angled (Y=470) impact respectively).

Figure 5A:
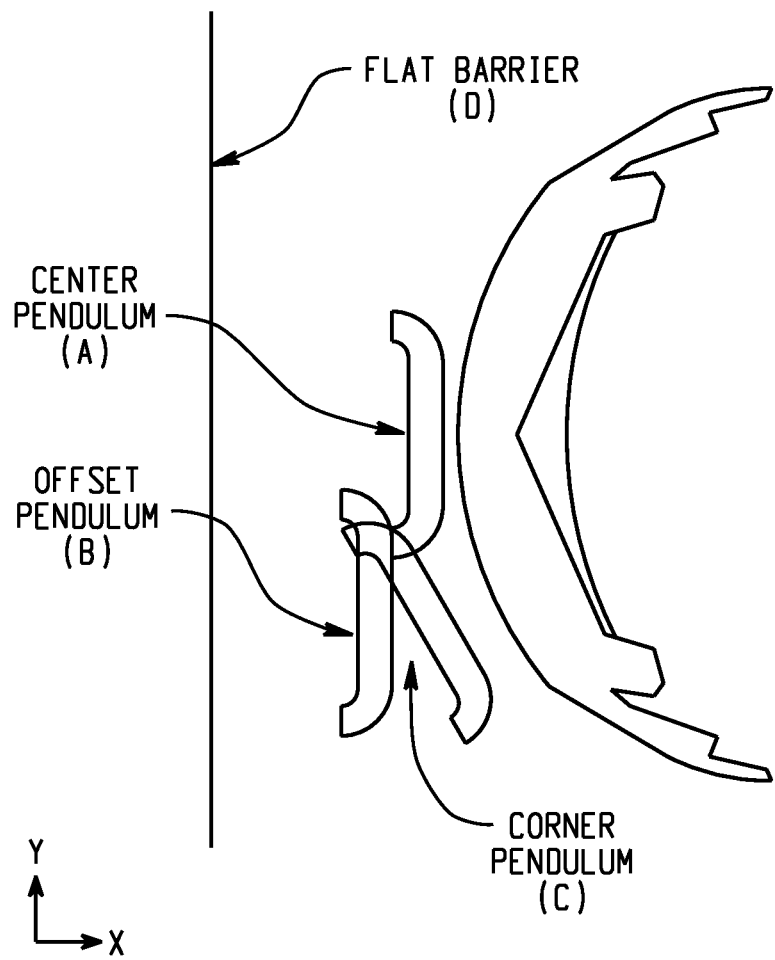
FIG. 5 shows a schematic illustration of low-speed (4 kph (2.5 mph)) vehicle-to-barrier (and vehicle to pendulum) impact test setup (5A) and the performance of the multi-stage EA system (5B).
Figure 5B:
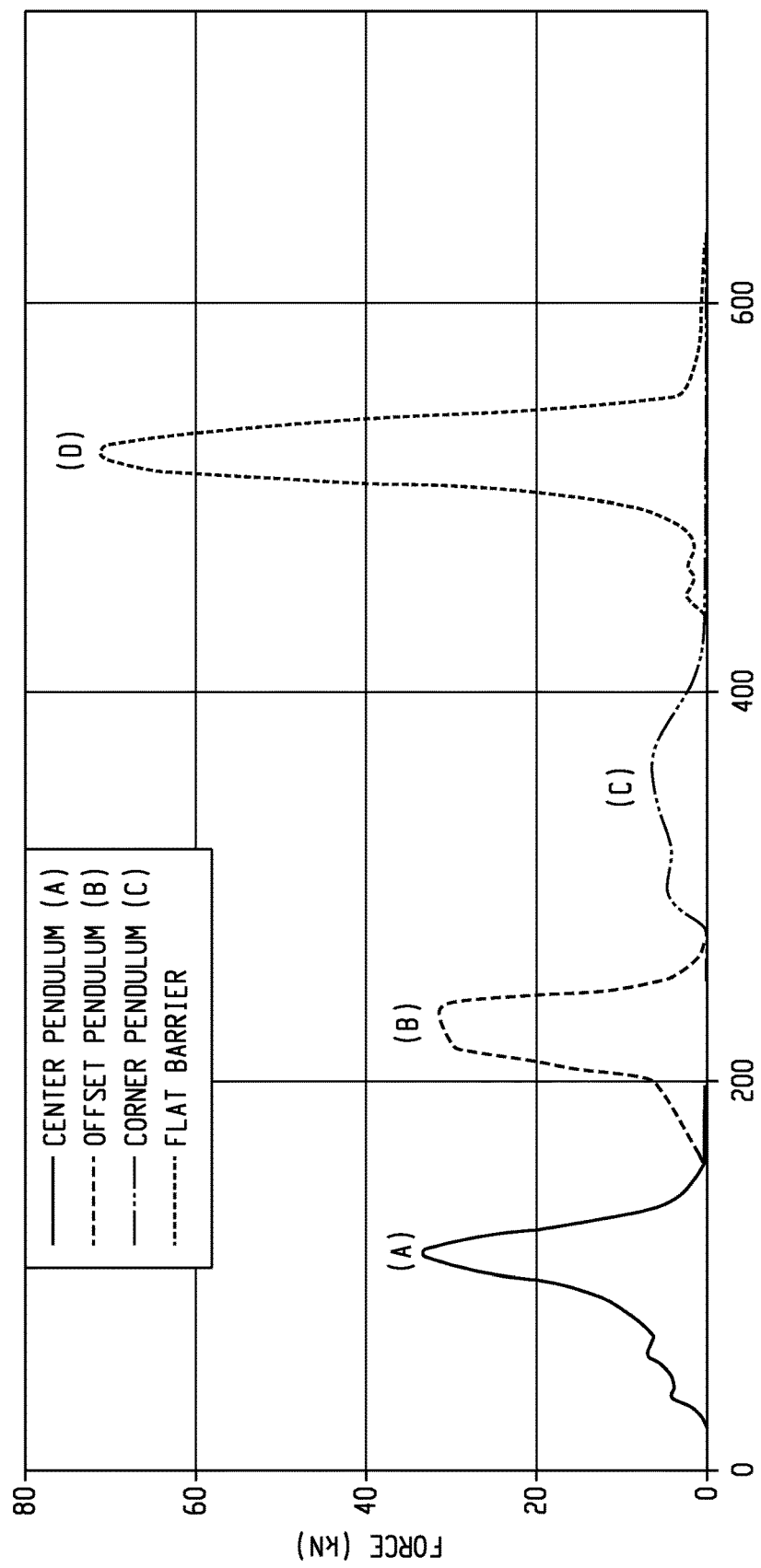

As may be seen in FIGS. 5A and B, a sequential impact simulation test was performed according to the requirement of 49 CFR Part 581, for low speed barrier impact. Performance results are shown in FIG. 5B. Vehicle setup is shown in FIG. 5A. The force intrusion curve, showing the performance of a dual-stage (n=2) EA structure shows a minimum back of the beam displacement resulting low in damageability to components behind the steel bumper beam and does not adversely affect the head lamp and hood, which is generally a requirement from the OEM and insurance agencies. In addition to pendulum impacts, an additional flat barrier impact was added, designated in FIG. 5B as "flat barrier".

Figure 6:
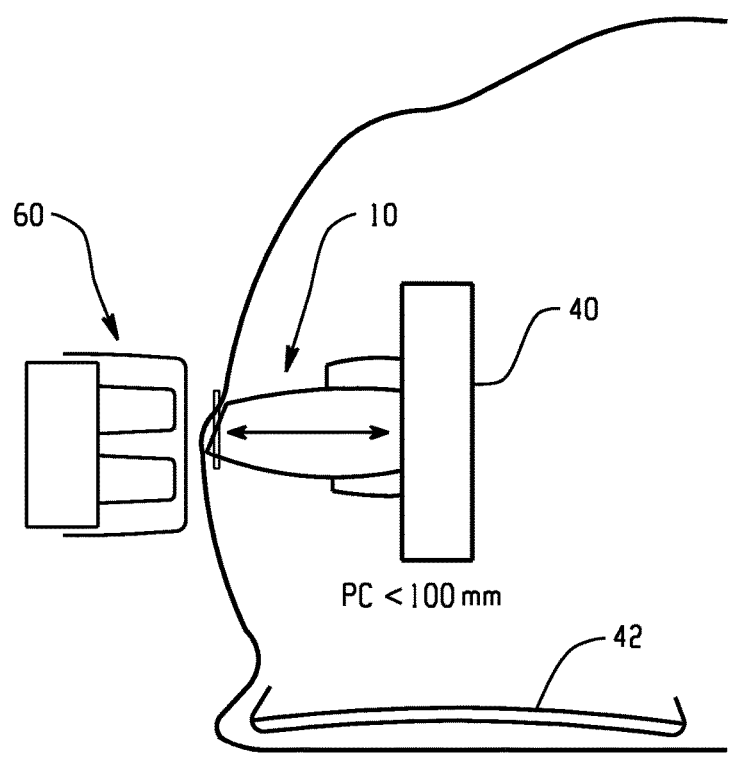
FIG. 6 shows a schematic illustration of a higher speed 10 kph vehicle-to-'bumper like barrier' impact test setup.
Figure 7:
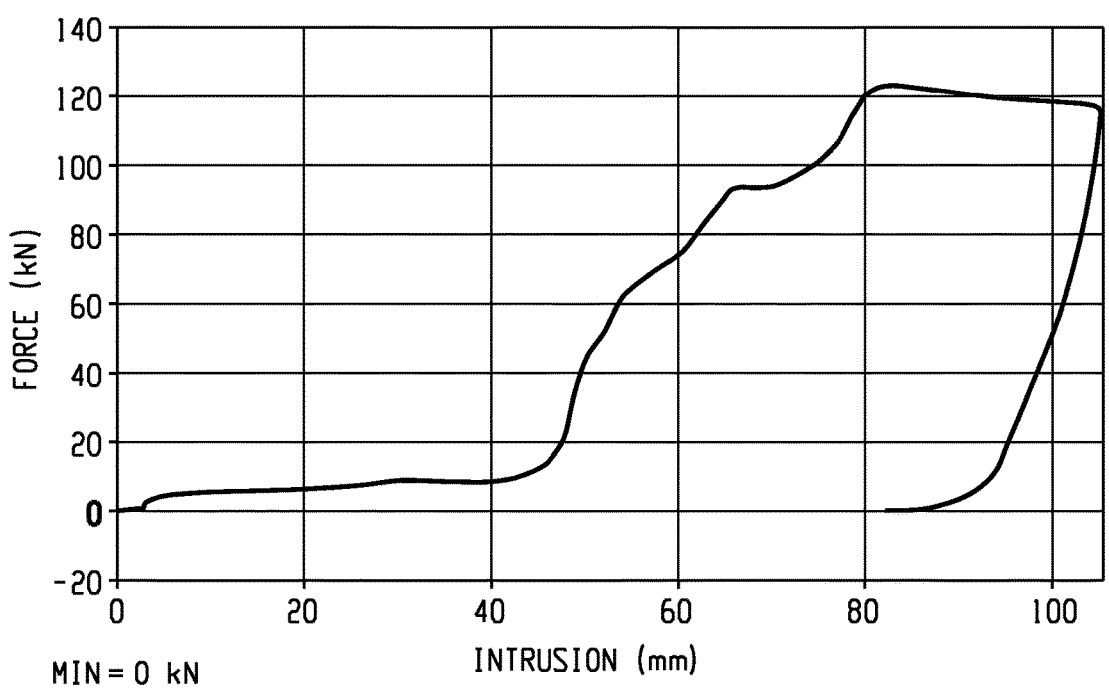
FIG. 7 is a graphical illustration of force versus intrusion determined using the test setup of FIG. 6.

With different vehicle heights, bumper-to-bumper mismatch is a concern. To address the real life impact and simulate the failure; IIHS regulations were drafted, requiring all vehicles to meet this regulatory standard to achieve a favorable rating. A schematic illustrating the vehicle to 'bumper like barrier' (60) setup is shown in FIG. 6. No damage is observed to the vehicle head lamp, which is the general guideline adopted by most OEMs. FIGS. 7 and 8 provide the results of a vehicle-to-vehicle moderate speed (40 mph) test as specified by the IIHS showing a dual stage energy absorbing system (n=1) where as shown in FIG. 7, intrusion does not surpass 110 mm. As shown in FIG. 8, the back beam displacement observed are safe in value (i.e. less than 40 mm), which would minimize the damage to components behind the bumper beam.

Many materials, several geometries, and several manufacturing processes are being used for the design of pedestrian-safe energy absorbers. Out of these, the most commonly used is the foam energy absorbers, which meet the pedestrian safe regulations but typically require higher packaging spaces (greater than 80 mm). Metallic energy absorbers, on the other hand, limit the designer with very limited geometries and uniform thickness, and hence are not very efficient for pedestrian safety. FIG. 9 shows a schematic illustration of a prior art foam and thermoplastic EA system, where a foam (80) is disposed over a thermoplastic spacer (50), the foam (80) comprised of a central piece (801), flanked by two outerboard pieces (802). The density of the outboard pieces (802) are often higher than the central piece (801) such that variable impact energies can be obtained.

Conversely, the disclosed system of energy absorbers for pedestrian safety is capable of meeting pedestrian-safety impact requirements (EEVC, ACEA (Phase II) and GTR) along with the other low-speed vehicle damageability requirements (C.F.R. Part 581, ECE42, IIHS and RCAR) when assembled over the automobile bumper beam. The multi-stage EA system provided herein is 30-40% more efficient than the prior art foam solution shown in FIG. 9, designed for lesser packaging space (approximately 30 mm), and 30% lighter than the foam solution.

In one embodiment, a multi-stage energy absorbing system comprises: a thermoplastic flanged frame and a crush lobe having a proximal base aligned with the flanged frame and a distal end protruding from the flanged frame. The crush lobe comprises a central slab and slab pairs such that the crush lobe comprises a total of 2i+1 slabs, wherein i is the number of slab pairs and is greater than or equal to 1. The slabs are disposed in a stepped arrangement and configured to absorb impact energy by collapsing in a telescopic manner with increasing energy level.

In one embodiment, a multi-stage energy absorbing system comprises: a base; a first stage extending from the base and defined by a first stage top load wall, a first stage bottom load wall, and a front wall that extends between the first stage top load wall and the first stage bottom load wall; and a second stage extending from the base and defined by a pair of second slabs located adjacent to the first stage, wherein one of the second slabs is defined by a portion of the first stage top load wall, a second stage top load wall, and a second stage front wall that extends between the portion of the first stage top load wall and the second stage top load wall, and wherein the other second slab is defined by a portion of the first stage bottom load wall, a second stage bottom load wall, and another second stage front wall that extends between the portion of the first stage bottom load wall and the second stage bottom load wall. The first stage can extend from the base a greater distance than the second stage. The second stage can be configured to absorb a greater amount of energy than the first stage.

In the various embodiments, (i) i can be 1 to 4; and/or (ii) the system is capable of absorbing 2 to 5 discrete energy levels; and/or (iii) a slab height of the central slab is different than a slab height of the slab pair located immediately adjacent the central slab; (iv) the slabs have a wall thickness defined according to formula (II)

$$T_1 < T_2 < \ldots < T_i \qquad (II)$$

wherein i is the number of slab pairs, T is the wall thickness of a center slab, $T_1$ is the wall thickness a first $i^{th}$ slab pair, and $T_i$ is the wall thickness of the last $i^{th}$ slab pair; and/or (v) the central slab shares a side with an adjacent slab, and wherein the central slab protrudes 20 mm to 70 mm beyond the adjacent slab; and/or (vi) i is greater than or equal to 2 and an i–1 slab pair protrudes 20 to 80 mm beyond its next adjacent slab on a side opposite the central slab; and/or (vii) the system is meets 49 C.F.R. Part 581, and/or meets IIHS bumper like barrier impact standard, and is rated as pedestrian safe; and/or (vii) the system is designed such that first stage absorbs impact energy of up to 450 Joules; and/or (ix) the system is designed such that an i=1 slab pair absorbs impact energy of up to 1,100 Joules; and/or (x) the system is designed such that an i=2 slab pair is configured to absorb impact of up to 7,000 Joules; and/or (xi) the system is designed such that an i=3 slab pair is configured to absorb impact of over 7,000 Joules; and/or (xii) the system is formed by injection molding of a unibody, wherein each slab pair extends beyond its predecessors culminating in the central slab; and/or (xiii) the central slab defines the distal end of the crush lobe; and/or (xiv) a member of at least one of the slab pairs has different height ("D") than another member of the slab pair; and/or (xv) a member of at least one of the slab pairs extends from the frame a different distance than another member of the slab pair; and/or (xvi) the wall thickness of each $i^{th}$ slab pair increases as a function of i such that the wall thickness of a first slab pair (i=1) is less than a wall thickness of a second slab pair (i=2), and wherein a central slab wall thickness is less than the first slab pair wall thickness; and/or (xvii) the central slab has a top load wall and a bottom load wall, and wherein the top load wall and/or the bottom load wall comprises a plurality of slots extending from a central slab front wall to a first slab pair front wall; and/or (xviii) the system has a mass of less than or equal to 1.15 Kg, and wherein the distance between the proximal base and distal end is less than or equal to 100 mm.

In one embodiment, a vehicle comprises: a bumper beam; a fascia; and an energy absorbing system located between the bumper beam and the fascia, wherein the energy absorbing system comprises any of the above embodiments of energy absorbing systems.

In one embodiment, a method for absorbing energy comprises: impacting an energy absorbing system with impact energy, wherein the energy absorbing system comprises any of the above embodiments of energy absorbing systems. The method can further comprise contacting a fascia prior to impacting the energy absorbing system. The energy absorbing system can be located between a fascia and a bumper beam.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

We claim:

1. A multi-stage energy absorbing system comprising:
   a thermoplastic flanged frame; and
   a crush lobe having a proximal base aligned with the flanged frame and a distal end protruding from the flanged frame, wherein the crush lobe comprises a central slab and slab pairs such that the crush lobe comprises a total of $2i+1$ slabs, wherein i is the number of slab pairs and is greater than or equal to 1; and
   wherein the central slab has load walls that extend from the base;
   wherein the slab pairs are disposed on opposite sides of the central slab;
   wherein the slabs are disposed in a stepped arrangement and configured to absorb impact energy by collapsing in a telescopic manner with increasing energy level; and
   wherein the system is designed such that first stage absorbs impact energy of up to 450 Joules.

2. The system of claim 1, wherein the system is formed by injection molding of a unibody, wherein each slab pair extends beyond its predecessors culminating in the central slab.

3. The system of claim 1, wherein the central slab defines the distal end of the crush lobe.

4. The system of claim 1, wherein a member of at least one of the slab pairs has different height ("D") than another member of the slab pair.

5. The system of claim 1, wherein a member of at least one of the slab pairs extends from the frame a different distance than another member of the slab pair.

6. The system of claim 1, wherein the wall thickness of each $i^{th}$ slab pair increases as a function of i such that the wall thickness of a first slab pair (i=1) is less than a wall thickness of a second slab pair (i=2), and wherein a central slab wall thickness is less than the first slab pair wall thickness.

7. The system of claim 1, wherein the system is designed such that an i=1 slab pair absorbs impact energy of up to 1,100 Joules.

8. The system of claim 7, wherein the system is designed such that an i=2 slab pair is configured to absorb impact of up to 7,000 Joules.

9. The system of claim 8, wherein the system is designed such that an i=3 slab pair is configured to absorb impact of over 7,000 Joules.

10. A multi-stage energy absorbing system comprising:
    a thermoplastic flanged frame; and
    a crush lobe having a proximal base aligned with the flanged frame and a distal end protruding from the flanged frame, wherein the crush lobe comprises a central slab and slab pairs such that the crush lobe comprises a total of $2i+1$ slabs, wherein i is the number of slab pairs and is greater than or equal to 1; and
    wherein the central slab has load walls that extend from the base;
    wherein the slab pairs are disposed on opposite sides of the central slab;
    wherein the slabs are disposed in a stepped arrangement and configured to absorb impact energy by collapsing in a telescopic manner with increasing energy level; and
    wherein the central slab has a top load wall and a bottom load wall, and wherein at least one of the top load wall and the bottom load wall comprises a plurality of slots extending from a central slab front wall to a first slab pair front wall.

11. The system of claim 10, having a mass of less than or equal to 1.15 Kg, and wherein the distance between the proximal base and distal end is less than or equal to 100 mm.

12. A multi-stage energy absorbing system comprising:
    a thermoplastic flanged frame; and
    a crush lobe having a proximal base aligned with the flanged frame and a distal end protruding from the flanged frame, wherein the crush lobe comprises a central slab and slab pairs such that the crush lobe comprises a total of $2i+1$ slabs, wherein i is the number of slab pairs and is greater than or equal to 1; and
    wherein the central slab has load walls that extend from the base;
    wherein the slab pairs are disposed on opposite sides of the central slab;
    wherein the slabs are disposed in a stepped arrangement and configured to absorb impact energy by collapsing in a telescopic manner with increasing energy level; and
    wherein the slabs have a wall thickness defined according to formula (II)

$$T_1 < T_2 < \ldots < T_i \quad (II)$$

wherein: i is the number of slab pairs
    T is the wall thickness of a center slab;
    $T_1$ is the wall thickness of a first $i^{th}$ slab pair;
    $T_2$ is the wall thickness a second $i^{th}$ slab pair; and
    $T_i$ is the wall thickness of the last $i^{th}$ slab pair.

13. The system of claim 12, wherein a slab height of the central slab is different than a slab height of the slab pair located immediately adjacent the central slab.

14. The system of claim 12, wherein the central slab shares a side with an adjacent slab, and wherein the central slab protrudes 20 mm to 70 mm beyond the adjacent slab.

15. The system of claim 12, wherein i is greater than or equal to 2 and an i−1 slab pair protrudes 20 to 80 mm beyond its next adjacent slab on a side opposite the central slab.

16. The system of claim 12, wherein the system meets 49 C.F.R. Part 581, meets IIHS bumper like barrier impact standard, or meets both 49 C.F.R. Part 581 and IIHS bumper like barrier impact standards, and is rated as pedestrian safe.

17. The system of claim 12, wherein i is 1 to 4.

18. The system of claim 17, wherein the system is capable of absorbing 2 to 5 discrete energy levels.

19. A method for absorbing energy comprising:
impacting an energy absorbing system with impact energy, wherein the energy absorbing system comprises
a base;
a first stage extending from the base and defined by a first stage top load wall, a first stage bottom load wall, and a front wall that extends between the first stage top load wall and the first stage bottom load wall; and
a second stage extending from the base and defined by a pair of second slabs located adjacent to the first stage, wherein one of the second slabs is defined by a portion of the first stage top load wall, a second stage top load wall, and a second stage front wall that extends between the portion of the first stage top load wall and the second stage top load wall, and wherein the other second slab is defined by a portion of the first stage bottom load wall, a second stage bottom load wall, and another second stage front wall that extends between the portion of the first stage bottom load wall and the second stage bottom load wall;
wherein the first stage extends from the base a greater distance than the second stage;
collapsing the first stage and absorbing 450 Joules of impact energy, wherein the second stage does not collapse upon the absorption of 450 Joules of impact energy; and
collapsing the second stage when absorbing up to 900 Joules of impact energy.

* * * * *